United States Patent
Kim et al.

(10) Patent No.: US 10,528,045 B2
(45) Date of Patent: Jan. 7, 2020

(54) METHOD AND APPARATUS FOR REMOTELY CONTROLLING VEHICLE

(71) Applicant: INFOBANK CORP., Seongnam-si, Gyeonggi-do (KR)

(72) Inventors: Jung Min Kim, Goyang-si (KR); Ji Sung Kim, Seoul (KR); Sang Gyeong Bae, Gwangmyeong-si (KR); Kwang Rim Ha, Seoul (KR); Chang Seok Youk, Bucheon-si (KR)

(73) Assignee: INFOBANK CORP., Seongnam-si (KR)

( * ) Notice: Subject to any disclaimer, the term of this patent is extended or adjusted under 35 U.S.C. 154(b) by 240 days.

(21) Appl. No.: 15/646,855

(22) Filed: Jul. 11, 2017

(65) Prior Publication Data

US 2018/0017970 A1    Jan. 18, 2018

(30) Foreign Application Priority Data

Jul. 15, 2016   (KR) .................. 10-2016-0090181

(51) Int. Cl.
*G05D 1/00* (2006.01)

(52) U.S. Cl.
CPC ......... *G05D 1/0061* (2013.01); *G05D 1/0011* (2013.01); *G05D 1/0066* (2013.01)

(58) Field of Classification Search
CPC ... B60W 30/00; G05D 1/0011; G05D 1/0061; G05D 1/0066; G05D 2201/0213
See application file for complete search history.

(56) References Cited

U.S. PATENT DOCUMENTS

| | | | | |
|---|---|---|---|---|
| 2012/0044046 A1* | 2/2012 | Al-Jafar | ............... | E01F 13/085 340/5.2 |
| 2012/0101660 A1* | 4/2012 | Hattori | ................ | G05D 1/0022 701/2 |
| 2016/0207538 A1* | 7/2016 | Urano | ................. | B60W 30/182 |
| 2016/0252903 A1* | 9/2016 | Prokhorov | .......... | B60W 30/143 701/23 |
| 2018/0037223 A1* | 2/2018 | Goto | ..................... | B60W 30/12 |
| 2019/0025825 A1* | 1/2019 | Takahama | ............ | B60W 50/14 |

FOREIGN PATENT DOCUMENTS

| | | |
|---|---|---|
| JP | 2011-131838 A | 7/2011 |
| JP | 2012-108868 A | 6/2012 |
| JP | 2015-056134 A | 3/2015 |

(Continued)

*Primary Examiner* — Anshul Sood
(74) *Attorney, Agent, or Firm* — Novick, Kim & Lee, PLLC; Sang Ho Lee

(57) ABSTRACT

Provided herein is a method of remotely controlling a vehicle, which includes identifying a vehicle entering an autonomous driving region, identifying autonomous driving authority information including a predetermined user's discretionary control right to the vehicle entering the autonomous driving region, remotely controlling a plurality of electronic elements included in the vehicle such that the vehicle moves along a set path corresponding to the autonomous driving region, and blocking a user's vehicle operation while autonomous driving is performed according to the remote control while allowing user's discretionary control for at least one of the plurality of electronic elements according to the autonomous driving authority information.

15 Claims, 7 Drawing Sheets

(56) References Cited

FOREIGN PATENT DOCUMENTS

| JP | 2016-034782 A | 3/2016 |
| JP | 2016-038846 A | 3/2016 |
| JP | 2016-043747 A | 4/2016 |
| JP | 2016-097770 A | 5/2016 |
| KR | 10-2015-0038776 A | 4/2015 |
| KR | 10-2016-0015028 A | 2/2016 |
| KR | 10-2016-0015987 A | 2/2016 |

* cited by examiner

| floor-zone | DISCRETIONARY CONTROL RIGHT | DETAILED SETTING (FOR AUTONOMOUS DRIVING) | | | |
|---|---|---|---|---|---|
| | | Speed(Km/h) | STERRING range | WINDOWS | DOORS |
| 1-A | HIGH | 20-30 | 1m | O | X |
| 1-B | LOW | 30 | X | X | X |
| 1-C | HIGH | 20-30 | 1m | O | O |
| 2-A | HIGH | 20-40 | 1m | O | X |
| 2-B | MID | 30 | 0.5m | O | X |
| 2-C | HIGH | 20-40 | 1m | O | O |
| 3-A | LOW | 20 | X | X | X |
| 3-B | LOW | 20 | X | X | X |
| 3-C | LOW | 20 | X | X | X |

METHOD AND APPARATUS FOR REMOTELY CONTROLLING VEHICLE

BACKGROUND OF THE INVENTION

Field of the Invention

The present invention relates to a method and apparatus for remotely controlling a vehicle. More particularly, the present invention relates to a method and apparatus for remotely controlling a vehicle, to enable authority setting during autonomous driving.

Description of the Related Art

Electrical and electronic devices provided in vehicles have increased beyond 35% all over the world. Nowadays, the number of vehicle ECUs increases from 30 to 100 according to the addition of more functions for safety and convenience, and electronic devices for infotainment are developed in a more complicated manner.

Due to the development of these vehicles and electronic systems, a variety of automatic driving systems are developed at present. There have been fully developed automation technologies such as lane keeping assistance systems (LKASs), automatic emergency breaking (AEB) systems, vehicle stability management (VSM) systems, smart parking assistance systems (SPASs), forward collision warning systems (FCWSs), and advanced smart cruise control (ASCC).

Accordingly, the development of autonomous driving made by integrating these technologies is speed up at present, and an autonomous vehicle that is recently tried out in USA has a driving distance of 2 million km.

However, a complete autonomous vehicle is not released due to issues relating to safety, costs, etc.

On the other hand, when a vehicle moves only on a partially set path such as a drive-through store or a gas station, there is a high possibility of ensuring safety. Therefore, there are proposed remote control systems for autonomous driving, which remotely control only vehicle driving on the partial path, and vehicle devices that assist remote control for autonomous driving.

However, even though the vehicle is driven on the partial path, problems related to a driver's operation may occur when the driving of the vehicle is controlled by receiving autonomous driving control commands from the autonomous driving control systems.

That is, if a driver's operation (for instance, a driver' accelerator pedal operation, a handle operation, or a brake pedal operation) is performed, the speed or direction of a vehicle that is autonomously traveling is changed, which may lead to collision accidents with a vehicle in front of or behind the vehicle or to collision accidents with surrounding structures.

On the other hand, for this reason, if the driver's operation is absolutely prohibited during autonomous driving, this may cause driver's inconvenience as well as anxiety.

In addition, in the case where the autonomous driving is fixed to be performed only at a predetermined speed and in a predetermined direction, there is a problem in that it is for a manager that manages an autonomous driving zone to control a specific zone, a vehicle flow for each situation, or the like.

SUMMARY OF THE INVENTION

Accordingly, the present invention has been made in view of the above-mentioned problem, and an object thereof is to provide a method and apparatus for remotely controlling a vehicle, which can prevent a driver from intervening in a vehicle while the vehicle is remotely and autonomously driven and can allow the driver to fluidly operate some electronic parts within a certain range while, according to control authority for each autonomous driving region, so as to ensure safety of autonomous driving for each movement path, improve user's convenience, and facilitate manager's control.

In accordance with an aspect of the present invention, a method of remotely controlling a vehicle includes identifying a vehicle entering an autonomous driving region, identifying autonomous driving authority information including a predetermined user's discretionary control right to the vehicle entering the autonomous driving region, remotely controlling a plurality of electronic elements included in the vehicle such that the vehicle moves along a set path corresponding to the autonomous driving region, and blocking a user's vehicle operation while autonomous driving is performed according to the remote control while allowing user's discretionary control for at least one of the plurality of electronic elements according to the autonomous driving authority information.

An apparatus for remotely controlling a vehicle according to an aspect of the present invention, includes a vehicle identification unit configured to identify a vehicle entering an autonomous driving region; an authority information management unit configured to identify autonomous driving authority information comprising a predetermined user's discretionary control right to the vehicle entering the autonomous driving region; and an autonomous driving control unit configured to remotely control a plurality of electronic elements comprised in the vehicle such that the vehicle moves along a set path corresponding to the autonomous driving region, wherein the autonomous driving control unit blocks a user's vehicle operation while autonomous driving is performed according to the remote control, and allows user's discretionary control for at least one of the plurality of electronic elements according to the autonomous driving authority information.

A method of controlling a vehicle control apparatus connected to a plurality of electronic parts, according to another aspect of the present invention includes: entering an autonomous driving region according to input of a user's vehicle operation; receiving, from a remote control apparatus, a remote control signal for remotely controlling a plurality of electronic elements comprised in a vehicle, such that the vehicle moves along a set path corresponding to the autonomous driving region, according to autonomous driving authority information comprising a predetermined user's discretionary control right to the autonomous driving region; performing autonomous driving in response to the remote control signal; and blocking the user's vehicle operation while the autonomous driving is performed, while allowing user's discretionary control for at least one of the plurality of electronic elements according to the autonomous driving authority information.

The method according to the present invention may be implemented as a program for execution on a computer and stored in a computer-readable recording medium.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EMBODIMENTS

Figure 1:
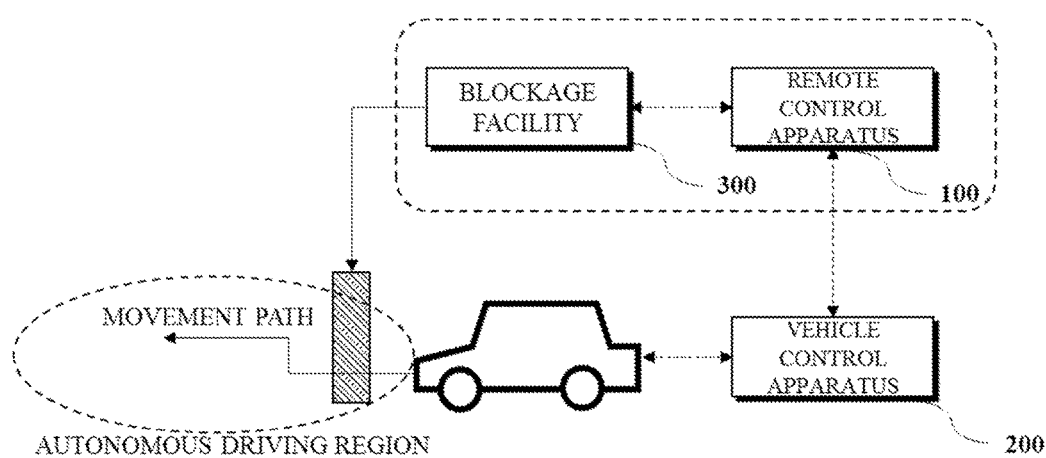
FIG. 1 is a conceptual diagram schematically illustrating an overall system according to an embodiment of the present invention.

Reference will now be made in detail to various embodiments of the present invention, examples of which are illustrated in the accompanying drawings and described below. The present invention may, however, be embodied in different forms and should not be construed as limited to the embodiments set forth herein.

While the present invention will be described in conjunction with exemplary embodiments, it will be understood that the present description is not intended to limit the invention to those exemplary embodiments. On the contrary, the present invention is intended to cover not only the exemplary embodiments, but also various alternatives, modifications, equivalents, replacements and other embodiments, which may be included within the spirit and scope of the present invention as defined by the appended claims. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof. Unless otherwise defined, all terms including technical and scientific terms used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined here. In addition, the following embodiments are provided so that this disclosure will be thorough and complete, and will fully convey the scope of the present invention to those skilled in the art. In the drawings, the shape, size, or the like of each component may be exaggerated for convenience of description and clarity.

In addition, it should be understood that, for example, block diagrams of the specification illustrate a conceptual aspect of an illustrative circuit for embodying principles of the present invention. The functions of various devices including processors or functional blocks expressed as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors and some of them may be shared. In addition, the terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the specification, components expressed as means for performing functions mentioned in detailed description are intended to include all methods of performing functions including all types of software including, for example, a combination of circuit devices performing these functions, firmware/micro codes, or the like, and are coupled to appropriate circuits for executing the software so as to execute these functions. It should be understood that since the functions provided by variously mentioned means are combined with each other and are combined with a scheme demanded by the claims in the present invention defined by the claims, any means capable of providing these functions are equivalent to means recognized from the specification.

Hereinafter, exemplary embodiments of the present invention will be described below in more detail with reference to the accompanying drawings.

FIG. 1 is a conceptual diagram schematically illustrating an overall system according to an embodiment of the present invention.

Referring to FIG. 1, the overall system according to the embodiment of the present invention includes a remote control apparatus 100, a vehicle control apparatus 200, and a blockage facility 300.

In the embodiment of the present invention, the remote control apparatus 100 and the blockage facility 300 may be implemented as a system for remotely controlling and managing a vehicle that enters an autonomous driving region. Although the remote control apparatus 100 and the blockage facility 300 are illustrated to be separate components in FIG. 1, they may also function as respective modules of a single autonomous driving management server.

In addition, the remote control apparatus 100 and the blockage facility 300 may be installed in various places that allow autonomous driving for each autonomous driving region in a certain section, and may be installed, for example, a parking garage, a drive-through store, or a gas station in which the vehicle moves only on a set path every certain zone and which includes a building management system.

Accordingly, the remote control apparatus 100 and the blockage facility 300 may be interconnected by wired or wireless network for interaction.

Meanwhile, the vehicle control apparatus 200 includes one or more control systems that are connected to respective electronic elements of the vehicle to perform control for the operation of the vehicle, and examples of the control systems may typically include an electronic control unit (ECU).

The vehicle control apparatus 200 may enter the autonomous driving region of the remote control apparatus 100 according to vehicle operation input by a user. The remote control apparatus 100 may identify the entry of the vehicle including the vehicle control apparatus 200 and may synchronize with the identified vehicle control apparatus 200.

For synchronization, the vehicle control apparatus 200 may communicate with the remote control apparatus 100 via wireless network. The synchronization may begin from one of the vehicle control apparatus 200 and the remote control apparatus 100, and a mutual recognition process may be executed in advance for synchronization.

That is, the vehicle control apparatus 200 may synchronize with the remote control apparatus 100, for example, by identifying the network ID of the remote control apparatus 100 from the blockage facility 300 in the autonomous driving region or an object around the same using a camera or the like, or by receiving the identification information of the remote control apparatus 100 which is broadcast from the remote control apparatus 100.

In addition, the remote control apparatus 100 may synchronize with the vehicle control apparatus 200, for example, by receiving the identification information of the vehicle control apparatus 200, which is broadcast from the vehicle control apparatus 200, or by receiving a synchronization request from the vehicle control apparatus 200.

When the synchronization process is completed, the remote control apparatus 100 may output an interface for user's consent to autonomous driving through the vehicle control apparatus 200. The remote control apparatus 100 may open the blockage facility 300 in response to the consent and transmit a control signal for autonomous driving to the vehicle control apparatus 200.

In this case, the vehicle control apparatus 200 may receive a remote control signal for remotely controlling a plurality of electronic elements included in the vehicle from the remote control apparatus 100 such that the vehicle moves along a set path corresponding to the autonomous driving region according to autonomous driving authority information including a predetermined user's discretionary control right to the autonomous driving region.

Thus, the vehicle control apparatus 200 may block the user's vehicle operation while the autonomous driving is performed, and may allow user's discretionary control for one of the electronic elements according to the autonomous driving authority information.

Thus, the vehicle control apparatus 200 may perform autonomous driving on an appropriate path according to the information on the position and direction of progress of the vehicle in response to the remote control signal. Thus, the autonomous driving may be remotely performed to a destination along the path of progress, and the vehicle may move to a desired facility (a parking position, a refueling position, an article reception place, or the like) by properly controlling speed and steering according to sensor information such as environment.

In addition, since the operation of the vehicle is basically blocked in the autonomous driving state, it is possible to previously prevent collision accidents between vehicles or collision with surrounding structures.

However, it may be unnecessary to block some function operations of the vehicle in a certain region. For example, in the specific autonomous driving region in which the vehicle moves to an exit after an article is received or refueling is completed, it is possible to allow a change of speed within a certain range or steering or window control.

Accordingly, for user' convenience, autonomous driving authority information for each autonomous driving region may be set in the remote control apparatus 100 by a manager. Thus, user's discretionary control may be allowed for a portion of vehicle functions according to the autonomous driving path section and zone set by the manager of the remote control apparatus 100.

For example, when it is determined that a user's civil complaint is brought due to inconvenience or autonomous driving is not fluidly performed for each zone, the manager of the remote control apparatus 100 may increase a driver's discretionary control right to a specific autonomous driving region.

In addition, when there is a need for minute movement and high safety is required as in a vehicle wash or a refueling station, the manager of the remote control apparatus 100 may lower a discretionary control right to an associated autonomous driving region.

As such, when the vehicle is remotely and autonomously driven, the system fluidly allows an operation within a certain range in some autonomous driving regions while blocking a driver from intervening in the vehicle. Consequently, it is possible to ensure safety of autonomous driving for each movement path, to improve user's convenience, and to fluidly and easily perform manager's control.

Figure 2:
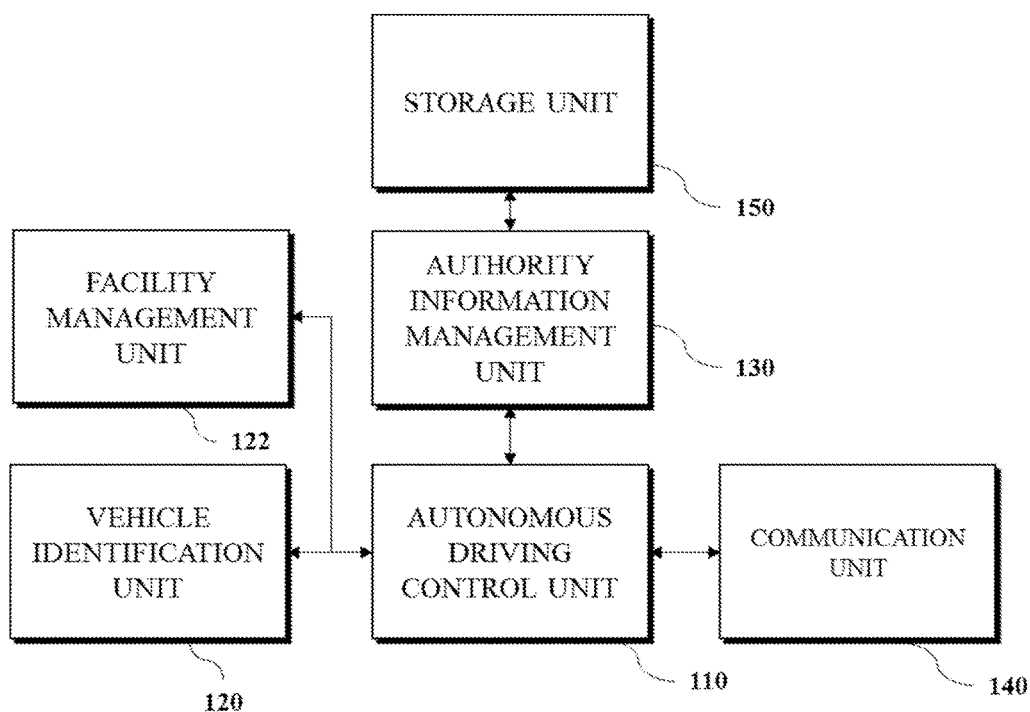
FIG. 2 is a block diagram illustrating in detail an apparatus for remotely controlling a vehicle according to the embodiment of the present invention.

FIG. 2 is a block diagram illustrating in detail an apparatus for remotely controlling a vehicle according to the embodiment of the present invention.

Referring to FIG. 2, the remote control apparatus 100 according to the embodiment of the present invention includes an autonomous driving control unit 110, a vehicle identification unit 120, a facility management unit 122, an authority information management unit 130, a communication unit 140, and a storage unit 150.

First, the vehicle identification unit 120 includes one or more identification members to identify a vehicle entering an autonomous driving region.

The vehicle identification unit 120 may include, for example, a photographing member that identifies a vehicle from an image, or a communication module that identifies vehicle information by receiving identification information broadcast from a vehicle.

The authority information management unit 130 identifies autonomous driving authority information including a predetermined user's discretionary control right to the vehicle entering the autonomous driving region.

Here, the authority information management unit 130 may set the autonomous driving authority information and build a database thereof through the storage unit 150.

As described above, the autonomous driving authority information may be set corresponding to each of zones or positions in the autonomous driving region. The manager of the remote control apparatus 100 may set an autonomous driving authority in consideration of characteristics for each of the positions or zones.

In addition, the movement path in the autonomous driving region may include one or more sections, and the autonomous driving authority information may be set for each of the sections.

The autonomous driving authority information may be individually set for vehicle identification information. For example, a broader discretionary control right may be given to a pre-registered vehicle.

The autonomous driving control unit 110 generates a remote control signal for remotely controlling a plurality of electronic elements included in the vehicle such that the vehicle moves along a set path corresponding to the autonomous driving region.

In addition, the autonomous driving control unit 110 may transmit the remote control signal to the vehicle control apparatus 200 through the communication unit 140.

To this end, the communication unit 140 may include one or more communication modules that transmit and receive a synchronization signal with the vehicle control apparatus 200 and the remote control signal to and from the vehicle control apparatus 200. Here, examples of the communication modules may include a local-area network module such as WiFi, Bluetooth, or NFC, or various wireless communication modules.

The autonomous driving control unit 110 blocks the user's vehicle operation while the autonomous driving is performed according to the remote control, and allows user's discretionary control for one of the electronic elements according to the autonomous driving authority information. For allowing of discretionary control, the autonomous driving control unit 110 may transmit the autonomous driving authority information to the vehicle control apparatus 200, and the vehicle control apparatus 200 may perform the blockage or release of the user's operation according to the received autonomous driving authority information for a certain time and in an allowable range according to autonomous driving.

Meanwhile, the facility management unit 122 may control the blockage facility 300. The autonomous driving control unit 110 may receive whether there is consent to autonomous driving from the vehicle control apparatus 200 before the vehicle enters the autonomous driving region, and may open the blockage facility 300 through the facility management unit 122 when the consent is done. Thus, a remote autonomous driving service may be provided only to a vehicle having the consent to autonomous driving.

Figure 3:
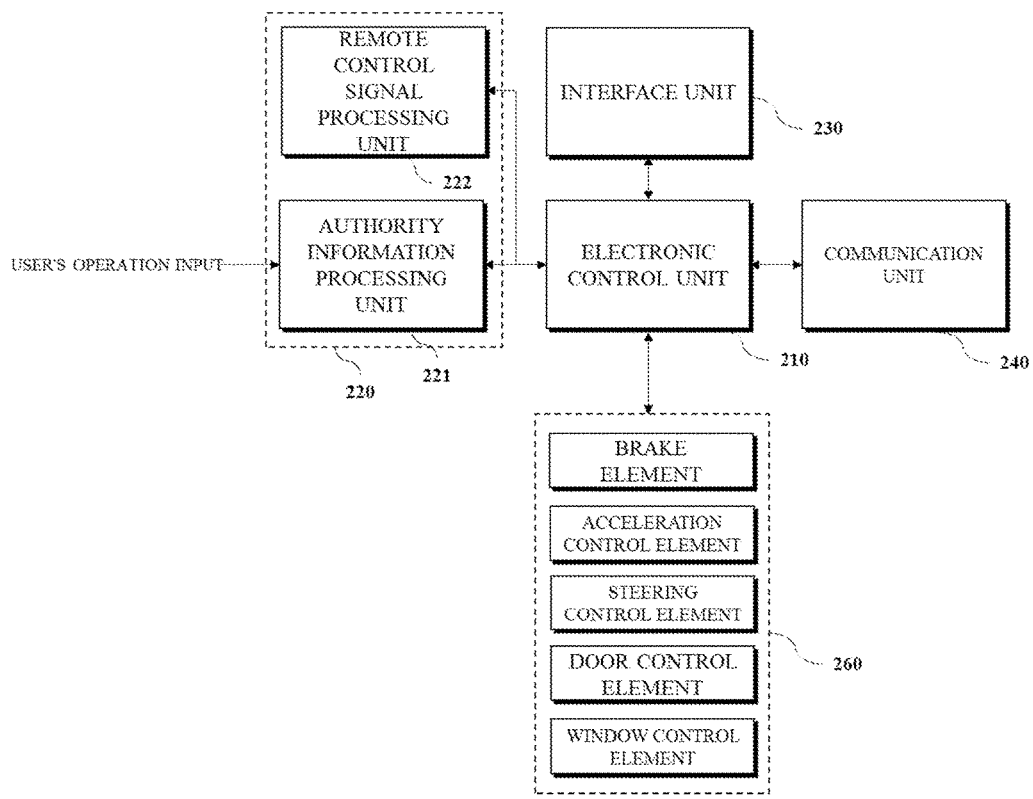
FIG. 3 is a block diagram illustrating in detail a vehicle control apparatus according to the embodiment of the present invention.

FIG. 3 is a block diagram illustrating in detail the vehicle control apparatus according to the embodiment of the present invention.

Referring to FIG. 3, the vehicle control apparatus 200 according to the embodiment of the present invention may include an electronic control unit 210, an autonomous driving processing unit 220, an interface unit 230, a communication unit 240, and a plurality of electronic elements 260.

First, the electronic control unit 210 may control the electronic elements 260 provided for the driving of the vehicle, according to user's operation input, using one or more vehicle control members.

The electronic elements 260 may include, for example, a brake element, an acceleration control element, a steering control element, a door control element, and a window control element, but these are illustrated by way of example. Therefore, various electronic parts mounted to the vehicle, for example an air conditioning system, may be included in the electronic elements 260.

The electronic control unit 210 may receive autonomous driving authority information and a request for confirmation of consent through the communication unit 240 from the synchronized remote control apparatus 100.

In addition, the electronic control unit 210 may output the received autonomous driving authority information and request for confirmation of consent through the interface unit 230, and may receive user's consent information. Thus, the electronic control unit 210 may transmit the consent information through the communication unit 240 to the remote control apparatus 100, and the blockage facility 300 may be opened in response to the consent.

When the consent is done, the autonomous driving processing unit 220 may process the remote control signal and the autonomous driving authority information received through the communication unit 240. To this end, the autonomous driving processing unit 220 of the vehicle control apparatus 200 may include a remote control signal processing unit 222 and an authority information processing unit 221.

The remote control signal processing unit 222 interprets a remote control signal to convert it into a control signal for actually controlling each of the electronic elements, and transmits the converted control signal to the electronic control unit 210. Thus, the electronic control unit 210 may control at least one function of the electronic elements 260 in response to the control signal.

In addition, the authority information processing unit 221 may determine whether or not to allow user's operation input based on the autonomous driving authority information, and may thus set an allowable range of each element. The allowable information may be applied to the electronic control unit 210 and be set as a user's operation range of each of the electronic elements 260.

For example, when discretionary control according to the user's input is allowed even though the vehicle is being autonomously driven, the user's input range of the steering control element may be set such that steering is performed only within a certain distance from the movement path in the autonomous driving region. However, when the user's input range exceeds the set range, the limitation of authority information may be output through the interface unit 230.

In addition, even when the vehicle is being autonomously driven, vehicle acceleration or deceleration control may be set to be allowed within a certain speed to a remote control speed, according to the autonomous driving authority information for each autonomous driving region. Thus, the user may input an operation to control the vehicle acceleration element or the brake control element within a certain range.

In addition, the electronic control unit 210 may block or allow door control in a certain autonomous driving region, and may also block or allow window control.

Such blocking or allowing process is performed according to the autonomous driving authority information received from the remote control apparatus 100. The actual determination of whether to allow the control may be performed in at least one of the vehicle control apparatus 200 and the remote control apparatus 100, and as a result, the actual transmission or blockage of an input signal may be performed in the vehicle control apparatus 200.

For example, the authority information processing unit 221 may filter a user' operation input signal according to the autonomous driving authority information during autonomous driving. The filtered control signal may be transmitted to the electronic control unit 210, so that the user's operation signal may be blocked or allowed.

Figure 4:
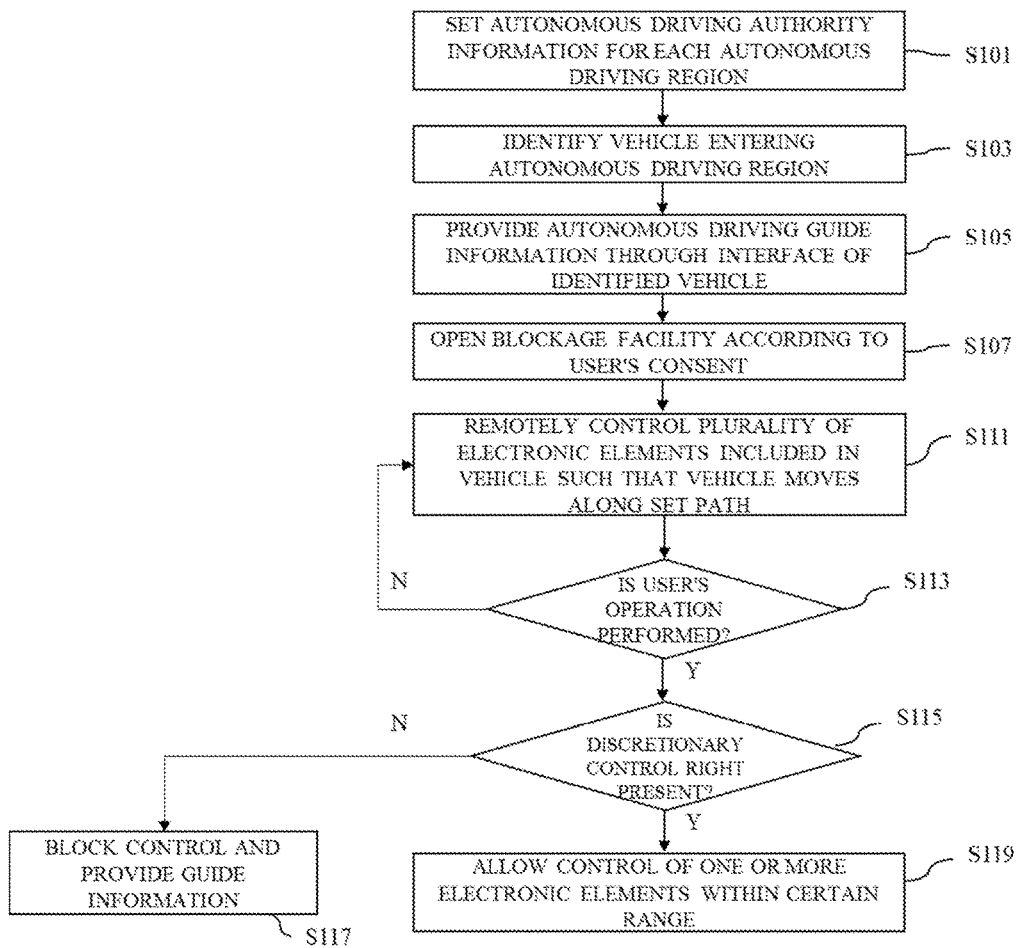
FIG. 4 is a flowchart for explaining a method of remotely controlling a vehicle according to the embodiment of the present invention.

FIG. 4 is a flowchart for explaining a method of remotely controlling a vehicle according to the embodiment of the present invention.

Referring to FIG. 4, the remote control apparatus 100 first sets autonomous driving authority information for each autonomous driving region through the authority information management unit 130 (S101).

The remote control apparatus 100 identifies a vehicle entering the autonomous driving region through the vehicle identification unit 120 (S103).

Next, the remote control apparatus 100 provides autonomous driving guide information through the interface unit 230 of the identified vehicle (S105).

To this end, the remote control apparatus 100 may generate guide information for outputting the autonomous driving authority information corresponding to the autonomous driving region to which the vehicle enters through the interface unit 230, and may transmit the guide information through the communication unit 140 to the vehicle control apparatus 200.

Next, when the remote control apparatus 100 receives user's consent to autonomous driving through from the vehicle control apparatus 200, it opens the blockage facility 300 through the facility management unit 122 (S107).

The remote control apparatus 100 may transmit a remote control signal for remotely controlling a plurality of electronic elements 260, included in the vehicle, through the autonomous driving control unit 110 to the vehicle control apparatus 200 such that the vehicle moves along a set path in the autonomous driving region (S111).

The remote control apparatus 100 or the vehicle control apparatus 200 determines whether or not a user's operation is performed (S113), and determines whether or not a discretionary control right corresponding to the user's operation is present in the autonomous driving authority information (S115).

Here, the determination of whether the user's operation is input and there is the control right may be performed in at least one of the autonomous driving control unit 110 of the remote control apparatus 100 and the autonomous driving processing unit 220 of the vehicle control apparatus 200. Although the determination may be performed in any unit, it is preferably performed in the autonomous driving processing unit 220 for rapid processing of signals.

When the user's operation is input without the discretionary control right, the remote control apparatus 100 or the vehicle control apparatus 200 blocks control and provides guide information corresponding to the control blockage through the interface unit 230 of the vehicle (S117).

Here, the blockage of the control signal may be performed in the autonomous driving processing unit 220 that receives the autonomous driving authority information from the remote control apparatus 100.

When there is the discretionary control right, the remote control apparatus 100 or the vehicle control apparatus 200 allows control of one or more electronic elements according to the user's operation within a certain range (S119).

In response to the allowing of control, the autonomous driving processing unit 220 may filter a user's input signal within a certain range and transmit the filtered signal to the electronic control unit 210.

Figures 5, 6:
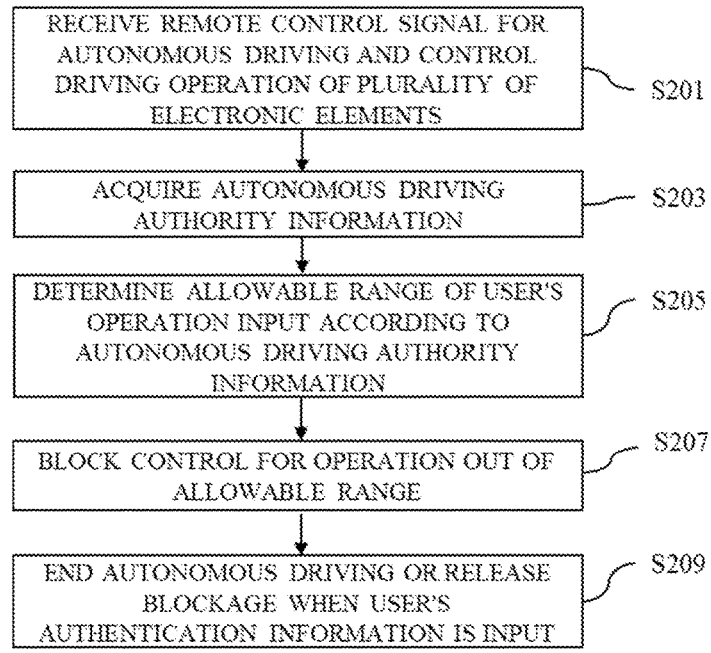
FIG. 5 is a flowchart for explaining a vehicle control method according to the embodiment of the present invention.
FIG. 6 is a view for explaining autonomous driving authority information according to the embodiment of the present invention.

FIG. 5 is a flowchart for explaining a vehicle control method according to the embodiment of the present invention.

FIG. 5 illustrates a signal processing process in the vehicle control apparatus 200 according to the embodiment of the present invention. First, the vehicle control apparatus 200 receives a remote control signal for autonomous driving through the communication unit 240, and converts the remote control signal into a control signal of the electronic control unit 210 through the autonomous driving processing unit 220 to control the driving operation of a plurality of electronic elements (S201).

The vehicle control apparatus 200 acquires autonomous driving authority information through the autonomous driving processing unit 220 (S203), and determines an allowable range of user's operation input according to the autonomous driving authority information (S205).

The vehicle control apparatus 200 blocks control for user's operation out of the allowable range through the autonomous driving processing unit 220 (S207).

To this end, the autonomous driving processing unit 220 may filter the blockage of the user' operation input signal, and may perform a process of preventing input within a certain allowable range from being transferring to the electronic control unit 210.

Next, the vehicle control apparatus 200 may end the autonomous driving through the autonomous driving processing unit 220 or release the blockage when user's authentication information is input for release of the autonomous driving (S209).

FIG. 6 is a view for explaining the autonomous driving authority information according to the embodiment of the present invention.

As illustrated in FIG. 6, the autonomous driving authority information may be set and stored through the authority information management unit 130, and may be differently set, for example, for each floor and zone of a building.

FIG. 6 illustrates that each floor of first, second, and third stories is classified into zones of A, B, and C, and illustrates that a discretionary control right is set in stages for each floor and zone. For example, the manager may set the discretionary control right to be high, middle, and low levels, thereby easily setting a degree of freedom of vehicle control even though the manager does not recognize detailed setting information.

For example, referring to FIG. 6, the discretionary control right may be set to be high in the case of 1st-floor zones A and C in which the vehicle somewhat freely moves, and the discretionary control right may be set to be low in the case of 1st-floor zone B in which safety must increase.

In addition, the remote control apparatus 100 may also provide detailed setting for autonomous driving. The detailed setting may include setting information on each of the plurality of electronic elements.

The detailed setting may include, for example, at least one of a vehicle speed range, a steering range, whether or not there is window control, and whether or not there is door control. It can be seen in FIG. 6 that the detailed setting is made such that, for example, in the case of 2nd-floor zone B, the speed is fixed to be 30 km/h, the steering range is a range of 0.5 m on the basis of movement path, the window control is possible, and the door control is impossible.

The autonomous driving authority information set as described above may be stored and managed through the authority information management unit 130, and may be transmitted to the vehicle control apparatus 200 to be used for authority confirmation, blockage, and allowing in the autonomous driving processing unit 220.

Figure 7:
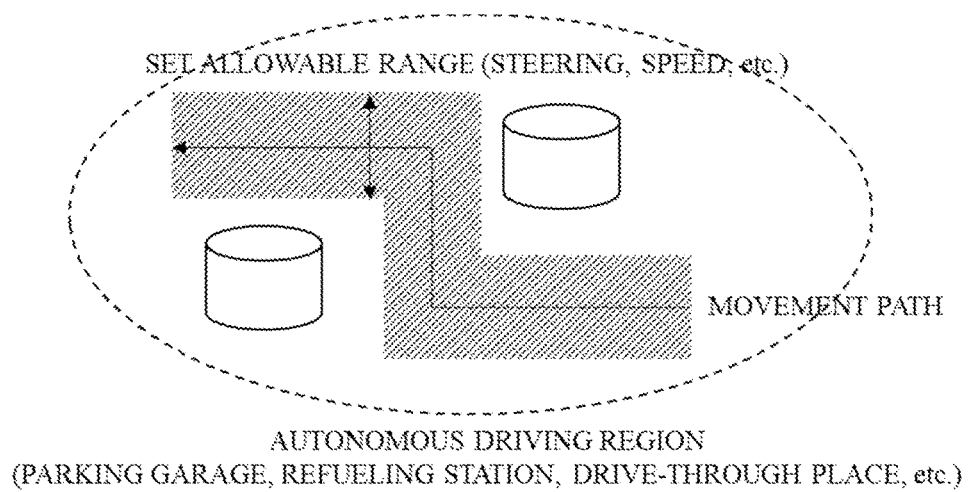
FIG. 7 is a view for explaining a movement path in an autonomous driving region and an allowable control range in response to the authority information according to the embodiment of the present invention.

FIG. 7 is a view for explaining a movement path in an autonomous driving region and an allowable control range in response to the authority information according to the embodiment of the present invention.

As illustrated in FIG. 7, the autonomous driving region may be set in a parking garage, a refueling station, a drive-through place, or the like. The vehicle may be remotely controlled along the movement path of the vehicle which is properly set for each autonomous driving region. In this case, the steering or allowable speed range may be set within a shadow region of FIG. 7, according to the autonomous driving authority information. Accordingly, since the discretionary control right is given to the vehicle driver within the allowable range of steering or speed even though the autonomous driving is performed, it is possible to increase user's convenience, to flexibly deal with dangerous situations, and to easily manage the autonomous driving region by the manager.

Figure 8:
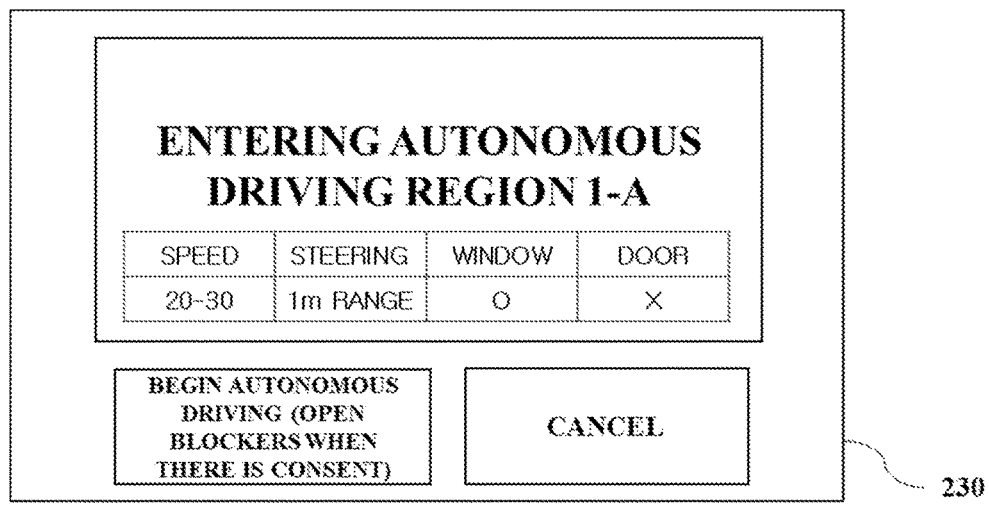
FIGS. 8 and 9 are views illustrating a vehicle interface screen for remote control according to the embodiment of the present invention.
Figure 9:
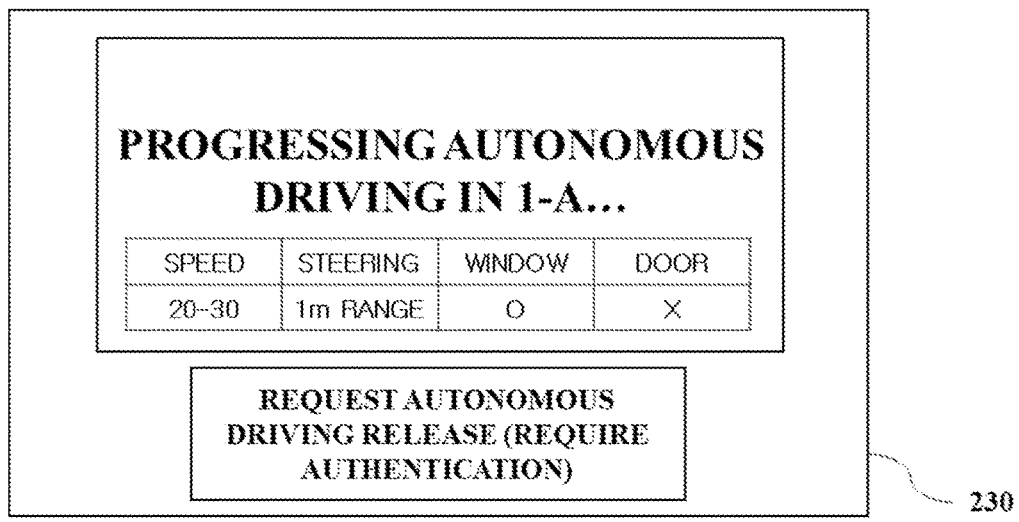

FIGS. 8 and 9 are views illustrating a vehicle interface screen for remote control according to the embodiment of the present invention.

FIG. 8 illustrates that the guide information received from the remote control apparatus 100 is output through the interface unit 230 to check whether there is consent before the vehicle enters the autonomous driving region. As illustrated in FIG. 8, in the interface unit 230, information on entering autonomous driving region 1-A may be output together with the autonomous driving authority information (control range of speed, steering, window, door, or the like) in the autonomous driving region.

The vehicle control apparatus 200 may receive whether there is consent to the guide information through the interface unit 230, and may transmit information on whether there is consent to the remote control apparatus 100, so that blockers of the blockage facility 300 is opened and the autonomous driving begins.

FIG. 9 illustrates an autonomous driving screen output through the interface unit 230 of the vehicle control apparatus 200 during autonomous driving. The region information in the autonomous driving region 1-A and the autonomous driving authority information (control range of speed, steering, window, door, or the like) in the autonomous driving region may be output together.

Meanwhile, referring to FIG. 9, the user may request autonomous driving release in the case of emergency situation or if needed. However, since the autonomous driving release may bring about a problem relating to safety, there is a need for approval from the autonomous driving control unit 100 of the remote control apparatus 100. Therefore, separately registered user's authentication information may be required. Thus, the vehicle driver may request the autonomous driving release from the remote control apparatus 100 by inputting the predetermined authentication information thereto.

For example, the authentication information may include driver's biometric information or an autonomous driving release code. For example, the release code may be generated in advance for single user and be transmitted to a portable terminal of the user or the like when autonomous driving begins. Thus, the autonomous driving control unit 110 may control the release of an autonomous driving mode according to the autonomous driving authority information and the user's authentication information.

As is apparent from the above description, in accordance with a method and apparatus for remotely controlling a vehicle according to exemplary embodiments of the present invention, it is possible to remotely control a plurality of electronic elements included in a vehicle such that the vehicle moves along a set path corresponding to an autonomous driving region according to autonomous driving authority information including a predetermined user's discretionary control right to the autonomous driving region. In addition, it is possible to block a user's vehicle operation while the autonomous driving is performed, and to allow user's discretionary control for at least one of the electronic elements according to the autonomous driving authority information.

Accordingly, when the vehicle is remotely and autonomously driven, it is possible to fluidly allow the operation of some electronic parts within a certain range while blocking a driver from intervening in the vehicle. Consequently, it is possible to ensure safety of autonomous driving for each movement path, to improve user's convenience, and to easily perform manager's control.

The above-mentioned methods can be embodied as programs executable in computers and be stored in computer-readable recording media. Examples of the computer-readable recording media include any computer-readable recoding media, e.g., ROM, RAM, CD-ROM, magnetic tapes, floppy disks, and optical-data storing devices, and storing media such as carrier waves (for example, transmission via Internet).

The computer-readable recording media can be distributed over computer systems connected to network so that computer-readable codes are written thereto and executed therefrom in a decentralized manner. Functional programs, codes, and code segments needed for embodying the method can be easily construed by computer programmers skilled in the art to which the present invention pertains.

Although the present invention has been described with respect to the illustrative embodiments, it will be apparent to those skilled in the art that various variations and modifications may be made without departing from the spirit and scope of the invention as defined in the following claims.

What is claimed is:

1. A method of remotely controlling a vehicle, the method comprising:
    identifying the vehicle entering an autonomous driving region;
    identifying autonomous driving authority information comprising a predetermined user's discretionary control right to the vehicle entering the autonomous driving region;
    remotely controlling a plurality of electronic elements comprised in the vehicle such that the vehicle moves along a set path corresponding to the autonomous driving region; and
    blocking a user's vehicle operation while autonomous driving is performed according to the remote control, while allowing the predetermined user's discretionary control for at least one of the plurality of electronic elements according to the autonomous driving authority information,
    wherein the autonomous driving authority information comprises user's discretionary control right information and allows vehicle acceleration or deceleration control within a certain speed range of a remote controlled speed, according to the autonomous driving region.

2. The method of claim 1, further comprising:
    setting the autonomous driving authority information, corresponding to a zone or a position in the autonomous driving region.

3. The method of claim 1, further comprising:
setting the autonomous driving authority information, corresponding to identification information of the vehicle.

4. The method of claim 1, wherein the path comprises one or more sections and the autonomous driving authority information is set for each of the one or more sections.

5. The method of claim 1, wherein the user's discretionary control right information allows vehicle steering control, according to the autonomous driving region.

6. The method of claim 1, further comprising:
providing autonomous driving guide information comprising the autonomous driving authority information through an interface of the vehicle, before the vehicle enters the autonomous driving region.

7. The method of claim 6, further comprising:
receiving consent information corresponding to the autonomous driving authority information through the interface of the vehicle, before the vehicle enters the autonomous driving region; and
controlling a blockage facility at an entrance of the autonomous driving region to be opened only when the consent information is received.

8. An apparatus for remotely controlling a vehicle, the apparatus comprising a processor configured to:
identify the vehicle entering an autonomous driving region;
identify autonomous driving authority information comprising a predetermined user's discretionary control right to the vehicle entering the autonomous driving region;
remotely control a plurality of electronic elements comprised in the vehicle such that the vehicle moves along a set path corresponding to the autonomous driving region; and
block a user's vehicle operation while autonomous driving is performed according to the remote control, and allow the predetermined user's discretionary control for at least one of the plurality of electronic elements according to the autonomous driving authority information,
wherein the autonomous driving authority information comprises user's discretionary control right information and allows vehicle acceleration or deceleration control within a certain speed range of a remote controlled speed, according to the autonomous driving region.

9. The apparatus of claim 8, wherein the plurality of electronic elements comprise at least one of a vehicle acceleration element, a brake element, a steering control element, a window control element, and a door control element.

10. The apparatus of claim 9, wherein the autonomous driving authority information is set for each of the plurality of electronic elements.

11. The apparatus of claim 8, wherein the processor is further configured to allow a release of an autonomous driving mode according to input of the autonomous driving authority information and user's authentication information.

12. The apparatus of claim 8,
wherein the processor is further configured to:
provide autonomous driving guide information comprising the autonomous driving authority information through an interface of the vehicle, and receives consent information corresponding to the autonomous driving authority information through the interface of the vehicle, before the vehicle enters the autonomous driving region; and
control a blockage facility at an entrance of the autonomous driving region to be opened only when the consent information is received.

13. A method of controlling a vehicle control apparatus connected to a plurality of electronic parts, the method comprising:
entering an autonomous driving region according to input of a user's vehicle operation;
receiving, from a remote control apparatus, a remote control signal for remotely controlling a plurality of electronic elements comprised in the vehicle, such that the vehicle moves along a set path corresponding to the autonomous driving region, according to autonomous driving authority information comprising a predetermined user's discretionary control right to the autonomous driving region;
performing autonomous driving in response to the remote control signal; and
blocking the user's vehicle operation while the autonomous driving is performed, while allowing the predetermined user's discretionary control for at least one of the plurality of electronic elements according to the autonomous driving authority information,
wherein the autonomous driving authority information comprises user's discretionary control right information and allows vehicle acceleration or deceleration control within a certain speed range of a remote controlled speed, according to the autonomous driving region.

14. A non-transitory computer readable recording medium in which a program for executing the method of claim 1 is recorded.

15. A non-transitory computer readable recording medium in which a program for executing the method of claim 13 is recorded.

* * * * *